United States Patent
Kurogi et al.

(10) Patent No.: US 8,045,322 B2
(45) Date of Patent: Oct. 25, 2011

(54) SOLID INSULATED BUS SWITCHGEAR

(75) Inventors: Takuya Kurogi, Hitachi (JP); Kenji Tsuchiya, Hitachi (JP); Takumi Ishikawa, Hitachi (JP); Naoki Nakatsugawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 12/496,033

(22) Filed: Jul. 1, 2009

(65) Prior Publication Data

US 2010/0002363 A1    Jan. 7, 2010

(30) Foreign Application Priority Data

Jul. 7, 2008  (JP) .................................. 2008-176665

(51) Int. Cl.
*H02B 13/02* (2006.01)
(52) U.S. Cl. ......... 361/614; 361/606; 361/608; 361/620
(58) Field of Classification Search .......... 361/605–606, 361/608, 612, 614, 618–620
See application file for complete search history.

(56) References Cited

U.S. PATENT DOCUMENTS

| | | | | |
|---|---|---|---|---|
| 4,146,915 A | * | 3/1979 | Yosida | 361/617 |
| 4,249,227 A | * | 2/1981 | Kato et al. | 361/622 |
| 4,351,990 A | * | 9/1982 | Hesselbart et al. | 200/50.22 |
| 4,504,885 A | * | 3/1985 | Yoshikawa et al. | 361/614 |
| 6,433,998 B2 | * | 8/2002 | Arioka et al. | 361/606 |
| 7,286,337 B2 | * | 10/2007 | Masuhara et al. | 361/620 |
| 2008/0007896 A1 | * | 1/2008 | Tsuchiya et al. | 361/612 |
| 2009/0159569 A1 | * | 6/2009 | Kurogi et al. | 218/157 |

FOREIGN PATENT DOCUMENTS

| | | |
|---|---|---|
| JP | 169304 | 5/1989 |
| JP | 2008-043181 | 2/2008 |

* cited by examiner

*Primary Examiner* — Zachary M Pape
(74) *Attorney, Agent, or Firm* — Brundidge & Stanger, P.C.

(57) ABSTRACT

A solid insulated bus switchgear including a cabinet having unit and bus rooms, first and second switching units, each having a circuit breaker, current transformer, zero-phase sequence current transformer, and instrument voltage transformer, main buses, a communication bus linked to the main buses, and connected to the first and the second switching units, and first and second leader buses, the first connected to the first switching unit, the second connected to the second switching unit. Each switching unit has a movable cart, the circuit breaker mounted on the cart, and a frame assembly. Two terminals are disposed on the back of the circuit breaker, one connected to a fixed electrode and the other connected to a movable electrode of the circuit breaker. The two terminals are connected to the communication bus and to the first or second leader bus through air bushings.

8 Claims, 10 Drawing Sheets

SOLID INSULATED BUS SWITCHGEAR

CLAIM OF PRIORITY

The present application claims priority from Japanese patent application serial No. 2008-176665, filed on Jul. 7, 2008, the content of which is hereby incorporated by reference into this application.

BACKGROUND OF THE INVENTION

1. Field of Technology

The present invention relates to a switchgear in an electric power reception and distribution facility, and more particularly to a switchgear that is structured with circuit breakers, current transformers, zero-phase sequence current transformers, instrument voltage transformers, and the like.

2. Background of Art

In general, a switchgear for electric power reception and distribution is structured by placing, in its case, circuit breakers, disconnecting switches, current transformers, zero-phase sequence current transformers, instrument voltage transformers, and the like. The circuit breaker and disconnecting switch are mounted as a unit on a cart that can be drawn. The circuit breaker and disconnecting switch are structured so that they can move away from and toward conductors at a power supply side and conductors at a load side when the cart moves.

In this type of electric power reception and distribution switchgear, to improve the reliability in protection against earth fault for the entire load including the circuit breaker, save in maintenance labor, and prolong the service life, the zero-phase sequence current transformer is disposed near the power supply of the circuit breaker included in the unit, and solid-insulated main buses are accommodated in a main bus room disposed separately from the unit rooms in which the units are accommodated (see Patent Document 1, for example).

Patent Document 1: Japanese Patent Laid-open No. 2008-43181

SUMMARY OF THE INVENTION

In the electric power reception and distribution switchgear described above, an abnormality such as an earth fault caused in the system is detected by the current transformer disposed near the load of the circuit breaker and by the zero-phase sequence current transformer disposed near the power supply of the circuit breaker, and thereby the circuit breaker trips. Accordingly, the entire load including the circuit breaker can be protected from an earth fault and the range of protection can be expanded, improving the reliability in protection against earth faults. Since the main buses are solid-insulated, maintenance to prevent short-circuits, which otherwise would be caused by dust buildups, is eliminated, saving in maintenance labor. Furthermore, since the solid-isolated main buses and the like are placed in the main bus room behind the unit rooms to shorten the insulation distances among the main buses, the storage space is reduced, enabling the entire apparatus to be downsized.

When electric power reception and distribution switchgears are placed side by side, however, a large installation area is needed as a whole, so an electric power reception and distribution switchgear for which a smaller side-by-side installation area is required is demanded.

The present invention addresses the above problem with the object of providing a solid insulated bus switchgear for electric power reception and distribution that requires a smaller side-by-side installation area than before.

(1) To achieve the above object, a solid insulated bus switchgear according to the present invention comprises: a cabinet having unit rooms defined by a ground metal plate on the front side and a bus room defined by the ground metal plate on the rear side; a first switching unit and a second switching unit, each of which has a circuit breaker, a current transformer, a zero-phase sequence current transformer, and an instrument voltage transformer, the first switching unit and the second switching unit being vertically stacked in the cabinet; main buses, which are solid-insulated, placed in the bus room of the cabinet in the width direction of the cabinet; a communication bus, which is solid-insulated, linked to the main buses, and connected to one end of the first switching unit at one end and to another end of the second switching unit at another end; and a first leader bus and a second leader bus, which are solid-insulated, the first leader bus being connected to another end of the first switching unit, the second leader bus being connected to another end of the second switching unit; wherein each of the first switching unit and the second switching unit has a movable cart, a circuit breaker mounted on the cart, and a frame assembly, to which the current transformer, the zero-phase sequence current transformer, and the instrument voltage transformer are attached, and standing on the cart to cover the outer circumferences of three planes (front and both sides) of the circuit breaker; and two terminals are vertically disposed upside or downside on the back of the circuit breaker, one being connected to a fixed electrode of the circuit breaker and the other being connected to a movable electrode of the circuit breaker; the two terminals are connected to the communication bus and to the first leader bus or second leader bus through air bushings provided on the cabinet so as to move away from and toward the communication buse and the first leader bus or the second leader bus.

(2) In (1) above, preferably the circuit breaker is disposed on the cart, the current transformer is fixed to the frame assembly so as to cover two-phase terminals of three-phase terminals of the circuit breaker at a load side, the zero-phase sequence current transformer is preferably fixed to the frame assembly so as to cover three-phase terminals of the circuit breaker at a power supply side, and the instrument voltage transformer is preferably connected through a fuse to the three-phase terminals of the circuit breaker at the load side or at the power supply side.

(3) In (1) or (2) above, preferably the instrument voltage transformer is formed with two single-phase voltage transformers that are disposed side by side on the inside of the front of the frame assembly.

(4) In any one of (1) to (3) above, preferably the circuit breaker is a vacuum circuit breaker.

(5) In any one of (1) to (4) above, preferably each of both sides of the frame assembly has semi-elliptic notches at places corresponding to the current transformer and zero-phase sequence current transformer to maintain insulation performance.

(6) In (1) above, preferably the surfaces of the main buses, the communication bus, and the first and second leader buses are each covered with a ground layer.

(7) In (1) above, preferably the switching unit is accommodated in the cabinet so as to be drawn toward the front of the cabinet.

(8) To achieve the above object, a solid insulated bus switchgear according to the present invention comprises: a cabinet having unit rooms defined by a ground metal plate on a front side thereof and a bus room defined by a ground metal plate on a rear side thereof; a switching unit disposed in an upper stage in the unit room of the cabinet, the switching unit having a circuit breaker, a current transformer, a zero-phase sequence current transformer, and an instrument voltage transformer; a switching unit disposed in an intermediate stage of the cabinet, the switching unit having a circuit breaker, current transformer, and a zero-phase sequence current transformer; a switching unit disposed in a lower stage of the cabinet, the switching unit having a disconnecting switch and an instrument voltage transformer, main buses, which are solid-insulated, placed in the bus room of the cabinet in the width direction of the cabinet; a communication bus, which is solid-insulated, linked to the main buses, and connected to one end of the switching unit in the upper stage at one end thereof and to one end of the switching unit in the intermediate stage at other end thereof; an auxiliary communication bus, which is solid-insulated, for connecting another end of the switching unit in the intermediate stage to one end of the switching unit in the lower stage; and a couple of leader buses, which are solid-insulated, being connected to another end of the each switching unit in the upper stage and in the lower stage, respectively; wherein each of the switching unit in the upper stage, in the intermediate stage and in the lower stage has a movable cart, the circuit breaker or the disconnecting switch mounted on the cart, and a frame assembly, to which at least one of the current transformer, the zero-phase sequence current transformer, and the instrument voltage transformer is attached, and standing on the cart to cover the outer circumferences of three planes (front and both sides) of the circuit breaker or the disconnecting switch; and two terminals are vertically disposed upside or downside on the back of the circuit breaker or the disconnecting switch, one being connected to a fixed electrode of the circuit breaker or the disconnecting switch and the other being connected to a movable electrode of the circuit breaker or the disconnecting switch; and the terminals are connected to the communication bus, the auxiliary communication bus, and the first leader bus, and the second leader bus through air bushings provided on the cabinet so as to move away from and toward the communication bus, the auxiliary communication bus, the first leader bus, and the second leader bus.

(9) In (8) above, preferably the disconnecting switch in the switching unit in the lower stage is a vacuum disconnecting switch.

According to the present invention, a circuit breaker and an instrument voltage transformer are placed in a single switching unit, so a parallel circuit between the circuit breaker and instrument voltage transformer can be formed with a single stage. By comparison, this type of parallel circuit requires two stages in the stacking structure of a conventional switchgear for electric power reception and distribution. Accordingly, in a side-by-side configuration, the number of cabinets can be greatly reduced, and thereby an area in which switchgears for electric power reception and distribution can be greatly reduced when they are installed side by side.

DETAILED DESCRIPTION OF THE PREFERRD EMBODIMENTS

First Embodiment

A first embodiment of a solid insulated bus switchgear in the present invention will be described below with reference to the drawings.

Figure 1:
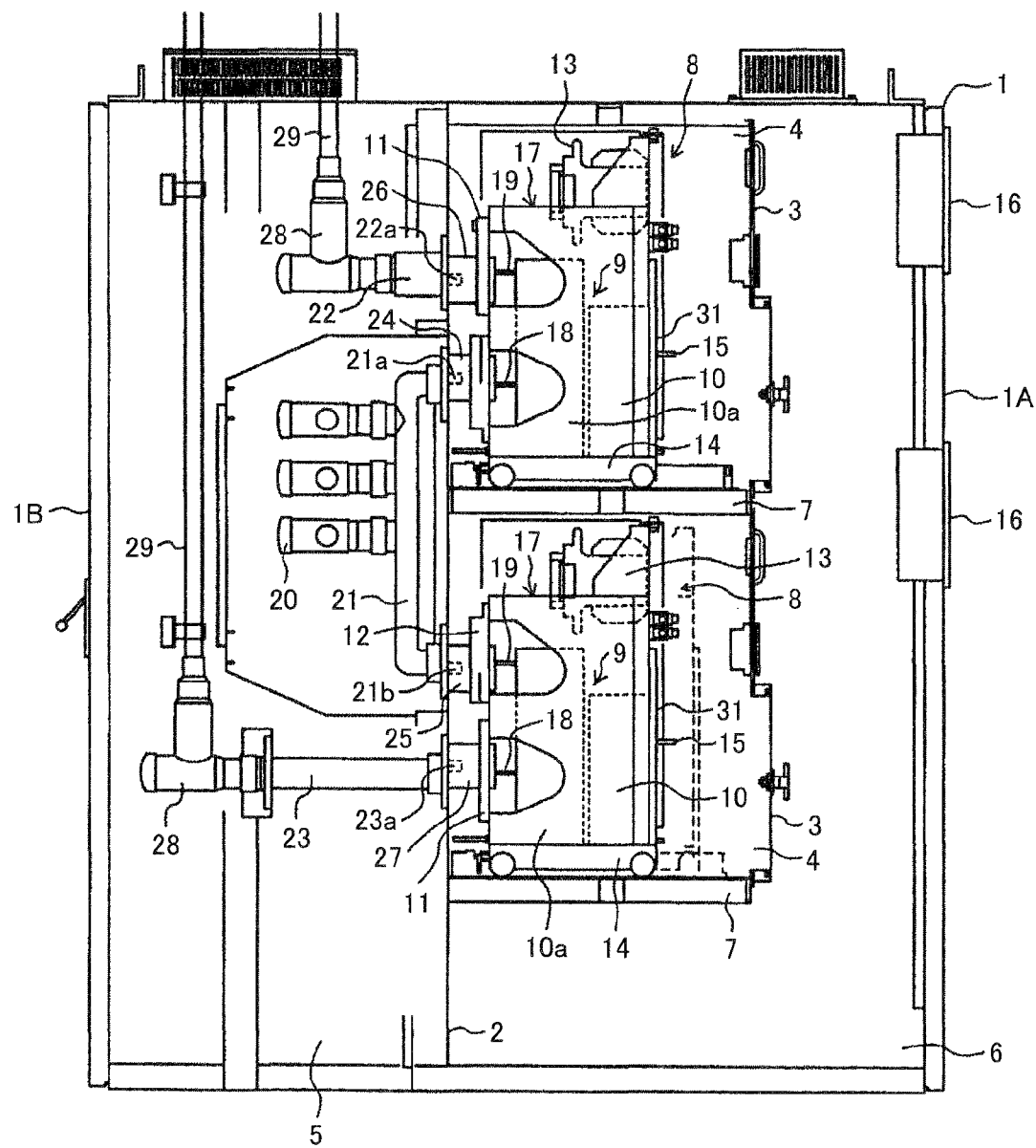
FIG. 1 is a vertical cross sectional view of a solid insulated bus switchgear in a first embodiment of the present invention.
Figure 2:
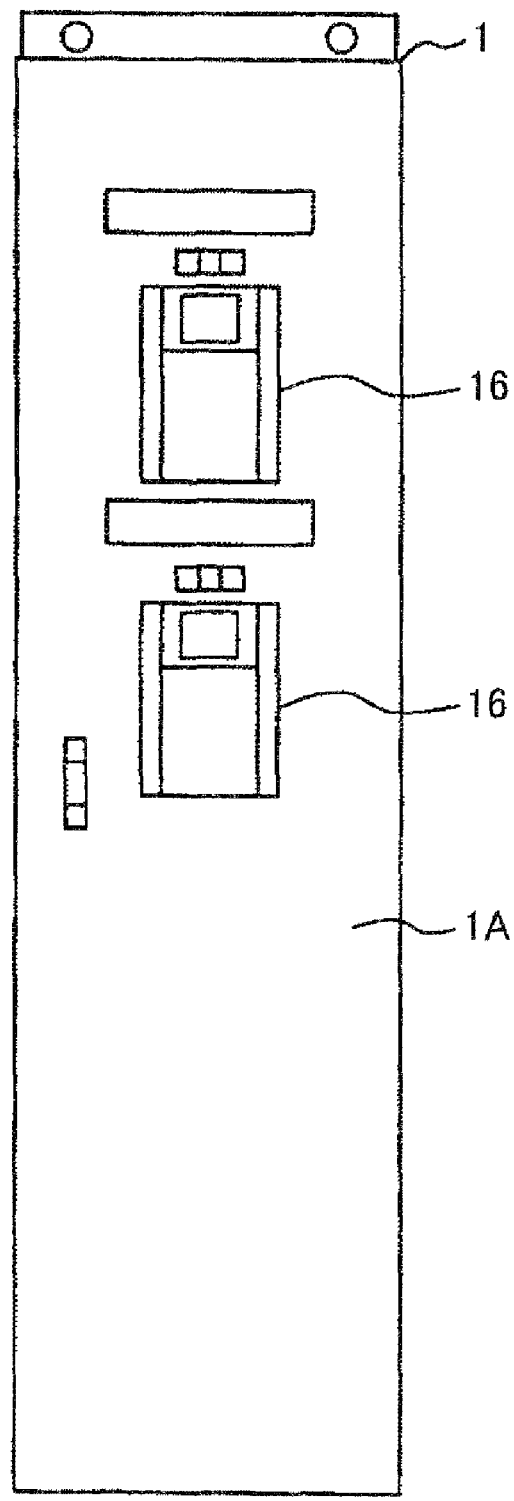
FIG. 2 is a front view of the solid insulated bus switchgear in the first embodiment of the present invention shown in FIG. 1.
Figure 3:
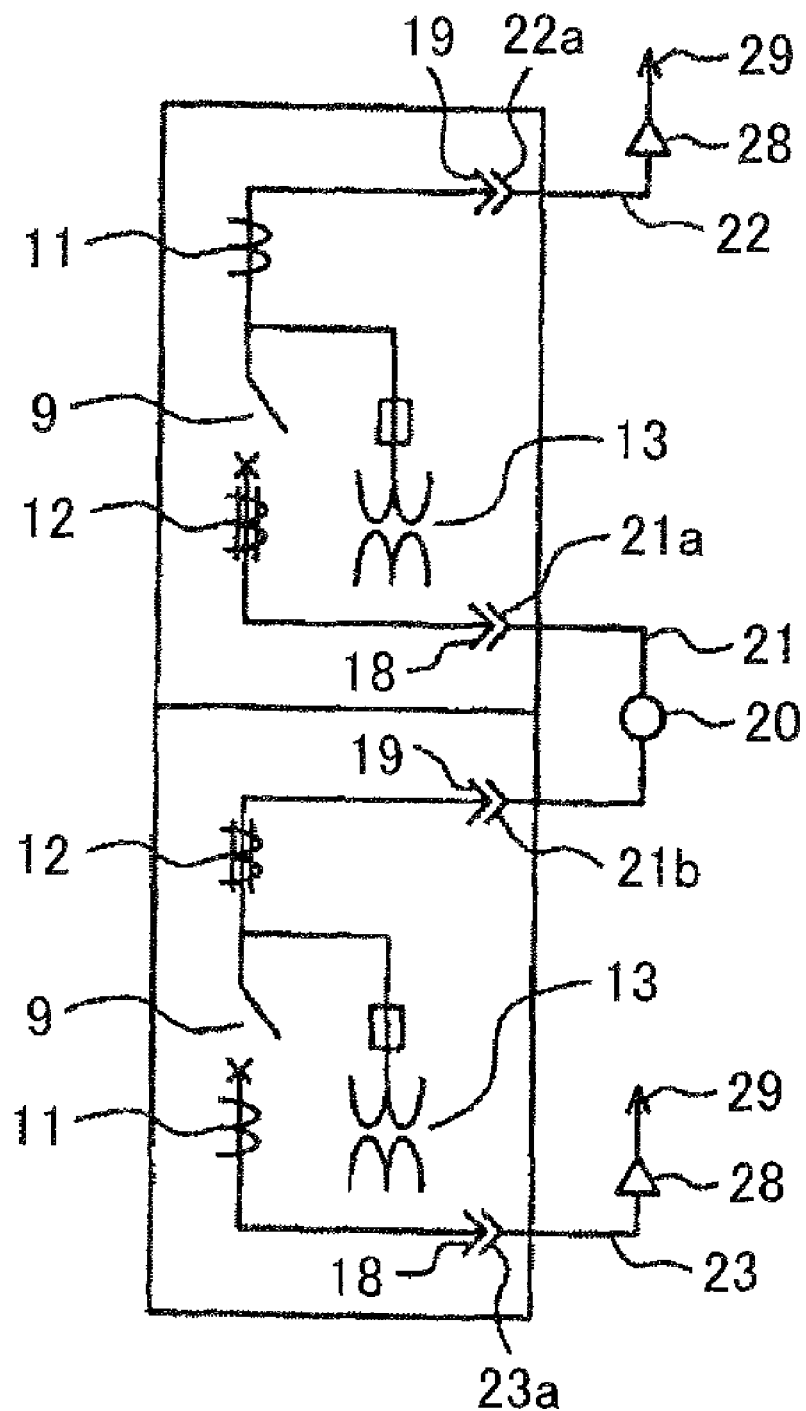
FIG. 3 is a schematic connection diagram of the solid insulated bus switchgear in the first embodiment of the present invention shown in FIG. 1.

FIGS. 1 to 3 show a solid insulated bus switchgear in a first embodiment of the present invention; FIG. 1 is a vertical cross sectional view of the solid insulated bus switchgear, FIG. 2 is a front view of the solid insulated bus switchgear in FIG. 1, and FIG. 3 is a schematic connection diagram of the solid insulated bus switchgear in FIG. 1.

In FIGS. 1 to 3, the cabinet 1 of the solid insulated bus switchgear is partitioned by a partitioning plate 2, which is a ground metal plate, into a front side and a rear side. A bus room 5 is defined on the rear side (left side in FIG. 1), and two unit rooms 4 are vertically defined with sealed covers 3 in a control room 6 on the front side (right side in FIG. 1). A front door 1A, which is openable and closable, is provided on the front of the cabinet 1, and rear door 1B, which is also openable and closable, is provided on the back of the cabinet 1. A control room 6 is defined between the unit rooms 4 and the back of the front door 1A. Protection controllers 16 are attached to the back of the front door 1A.

A support plate 7, which is substantially rectangular, is provided at the bottom of each unit room 4; the support plate 7 fixes the three outer sides of the unit room 4 to the partitioning plate 2 and the inner surfaces of both sides of the cabinet 1. Two switching units 8 are mounted on the support plates 7. The switching unit 8 has a shutdown part 10a of a vacuum circuit breaker (VCB) 9 for shutting down current to a power supply circuit, a shutdown part 10a of the vacuum circuit breaker 9, an operation unit 10 for the vacuum circuit breaker 9 that opens and closes the shutdown part 10a, a current transformer (CT) 11 connected to a terminal of the vacuum circuit breaker 9 at a load side, a zero-phase sequence current transformer (ZCT) 12 connected to a terminal of the operation unit 10 at the power supply side, and an instrument voltage transformer (VT) 13 disposed on the top of the operation unit 10 and connected to one of the above terminals.

Each of the two switching units 8 has a front cover 31 on its front (on the right side in FIG. 1). The front cover 31 has a rod-shaped drawer handle 15 substantially at the center in the vertical direction. The each switching unit 8 is mounted on a cart 14, on which a frame assembly 17 stands to cover the outer circumferences of the three planes (front and both sides) of the vacuum circuit breaker 9 and operation unit 10. The current transformer 11, the zero-phase sequence current transformer 12, and the instrument voltage transformer 13 are attached to the frame assembly 17.

The vacuum circuit breaker 9, the current transformer 11, and the zero-phase sequence current transformer 12 in the switching unit 8 described above are connected in series as shown in FIG. 3. The zero-phase sequence current transformer 12 is disposed at the power supply side of the vacuum circuit breaker 9, and the current transformers 11 are disposed at the load side of the vacuum circuit breaker 9. The instrument voltage transformer 13 in the upper stage is disposed at the load side of the vacuum circuit breaker 9, and the instrument voltage transformer 13 in the lower stage is disposed at the power supply side of the vacuum circuit breaker 9.

A terminal 18 connected to the fixed electrode (lower side) of the vacuum circuit breaker 9 and a terminal 19 connected to the movable electrode (upper side) of the vacuum circuit breaker 9 are provided on the back of the switching unit 8, as shown in FIG. 3. The terminals 18 and 19 are connected to a communication bus 21 connected to main buses 20 in the bus room 5 and to leader buses 22 and 23 so as to move away from and toward these buses through air disconnection bushings (these buses will be described later).

In the bus room 5 in FIG. 1, the main buses 20, which are solid-insulated, are disposed in the width direction of the cabinet 1, substantially at the center of the cabinet 1 in the vertical direction. One edge of the communication bus 21, which is also solid-insulated, is connected to the main buses 20. The other edge of the communication bus 21 is branched; one end of the branch is a connection terminal 21a and the other end is a connection terminal 21b. The connection terminal 21a on the one end is placed in the upper unit room 4 so that it can move away from and toward the terminal 18 in the upper switching unit 8. The connection terminal 21b on the other end is placed in the lower unit room 4 so that it can move away from and toward the terminal 19 in the lower switching unit 8. The connection terminals 21a and 21b are fixed to the partitioning plate 2 through air disconnection bushings 24 and 25.

The leader buses 22 and 23, which are solid-insulated, are respectively disposed at an upper part and lower part in the bus room 5. A connection terminal 22a is provided at one end of the upper leader bus 22. The connection terminal 22a is placed in the upper unit room 4 so that it can move away from and toward the terminal 19, described above, in the upper switching unit 8, and fixed to the partitioning plate 2 through an air disconnection bushing 26. The other end of the upper leader bus 22 is connected to a cable head 28.

A connection terminal 23a is provided at one end of the lower leader bus 23. The connection terminal 23a is placed in the lower unit room 4 so that it can move away from and toward the terminal 18, described above, in the lower switching unit 8, and fixed to the partitioning plate 2 through an air disconnection bushing 27. The other end of the lower leader bus 23 is connected to another cable head 28. The cable heads 28 are connected to the ends of cables 29. The other ends of the cables 29 extend above the cabinet 1.

The surfaces of the main buses 20, communication bus 21, and leader buses 22 and 23 are each covered with a ground layer to ensure safety against electric shocks. These buses require less maintenance, saving in maintenance labor.

Figure 4:
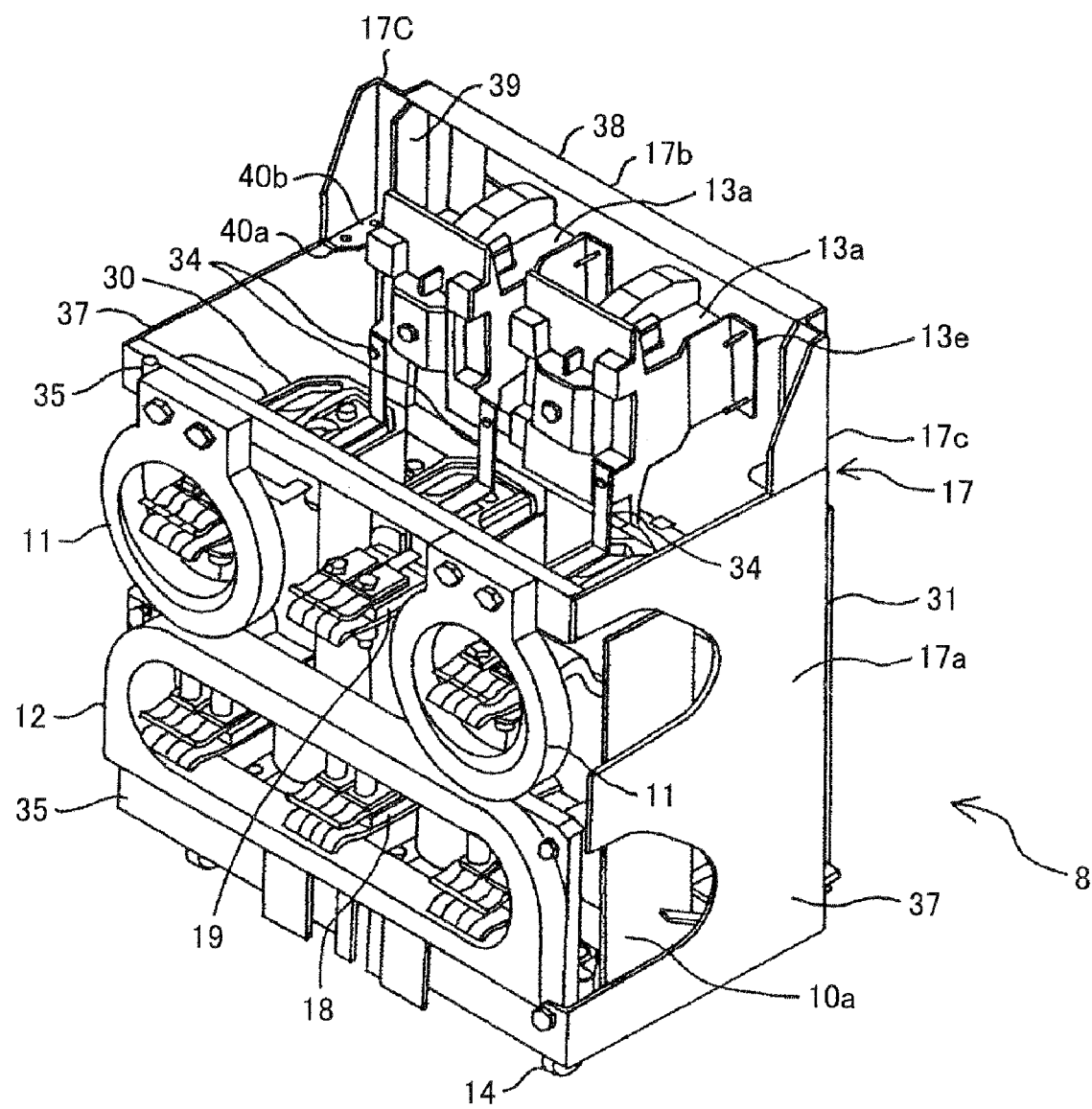
FIG. 4 is a perspective view of a switching unit in the solid insulated bus switchgear in the first embodiment of the present invention.

Next, a switching unit 8 in the solid insulated bus switchgear in the embodiment of the present invention described above will be detailed with reference to FIGS. 4 to 6. FIG. 4 is a perspective view of the switching unit in the solid insulated bus switchgear in the first embodiment of the present invention, FIG. 5 is a side view of the switching unit in the solid insulated bus switchgear in the first embodiment of the present invention shown in FIG. 4, and FIGS. 6A and 6B are side views illustrating the assembling and disassembling of the switching unit in the solid insulated bus switchgear in the first embodiment of the present invention shown in FIG. 4.

Figure 5:
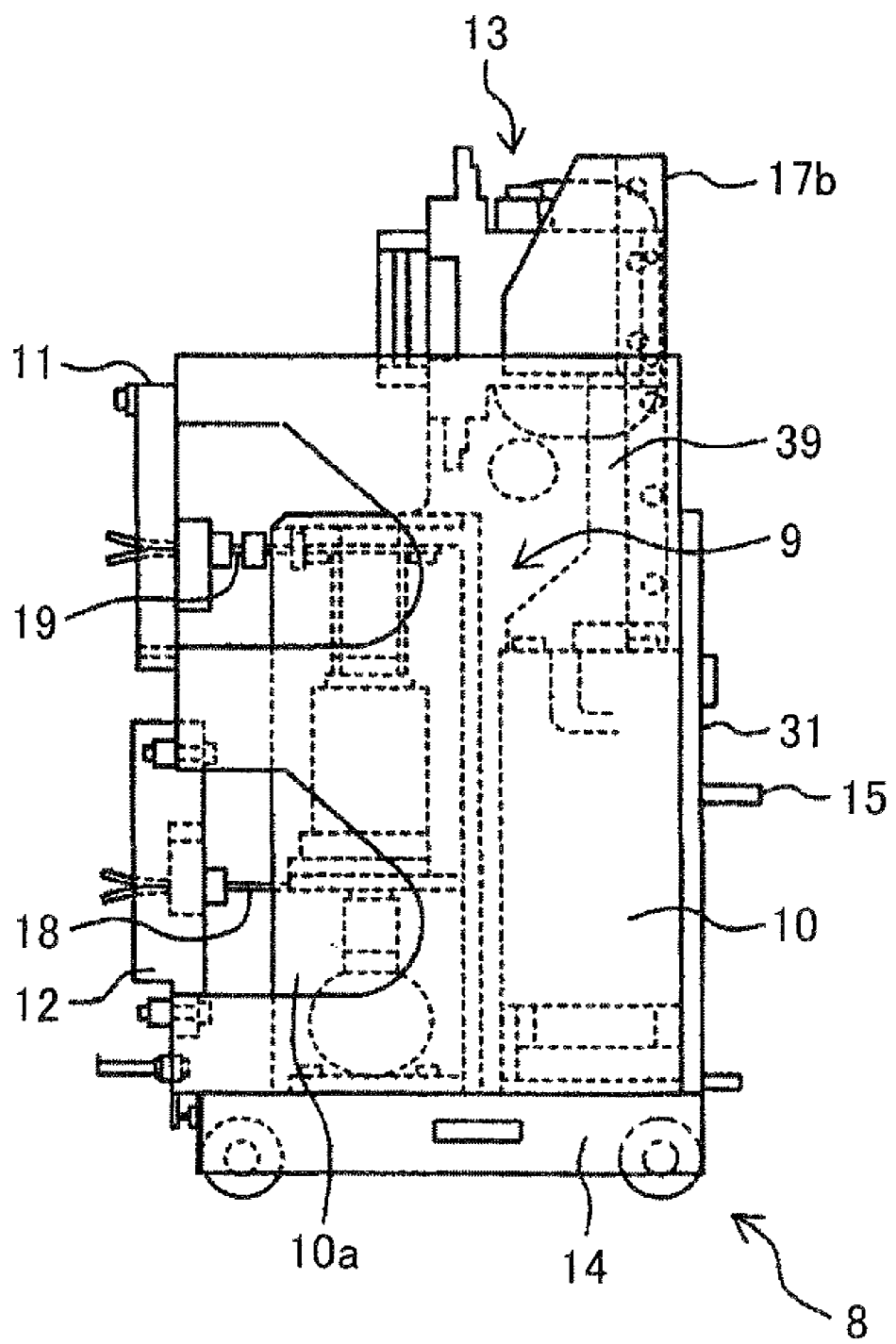
FIG. 5 is a side view of the switching unit in the solid insulated bus switchgear in the first embodiment of the present invention shown in FIG. 4.
Figure 6A:
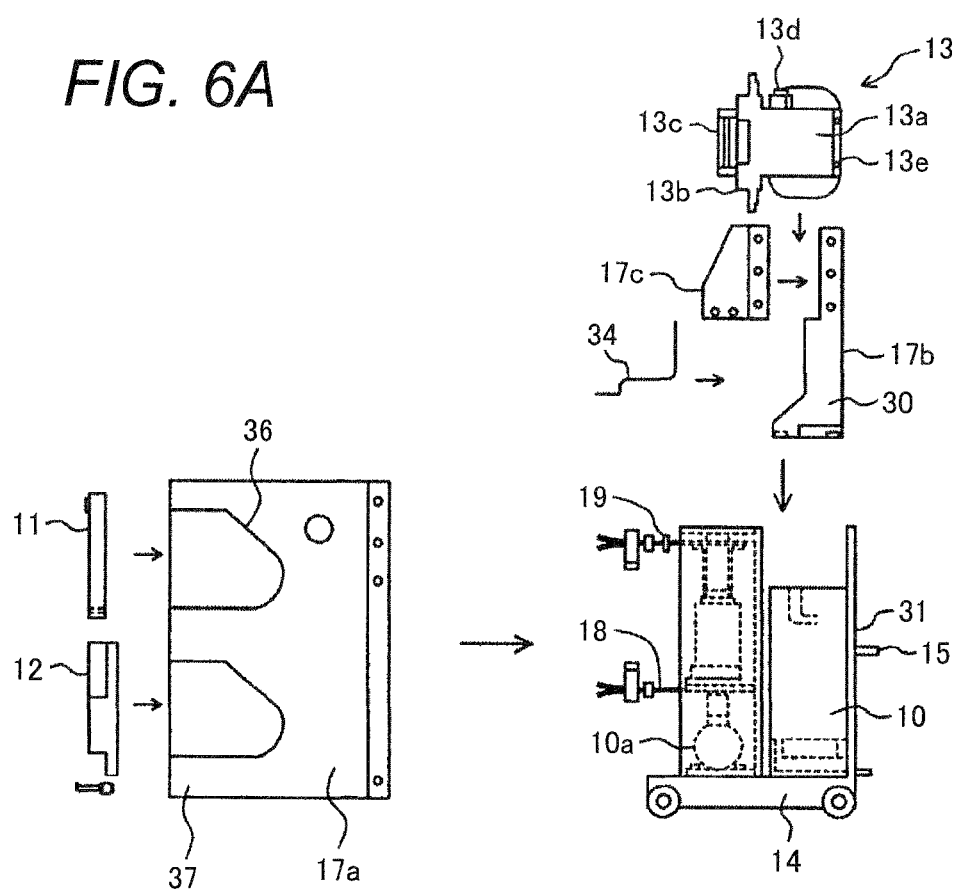
FIGS. 6A and 6B are side views illustrating the assembling and disassembling of the switching unit in the solid insulated bus switchgear in the first embodiment of the present invention shown in FIG. 4.
Figure 6B:
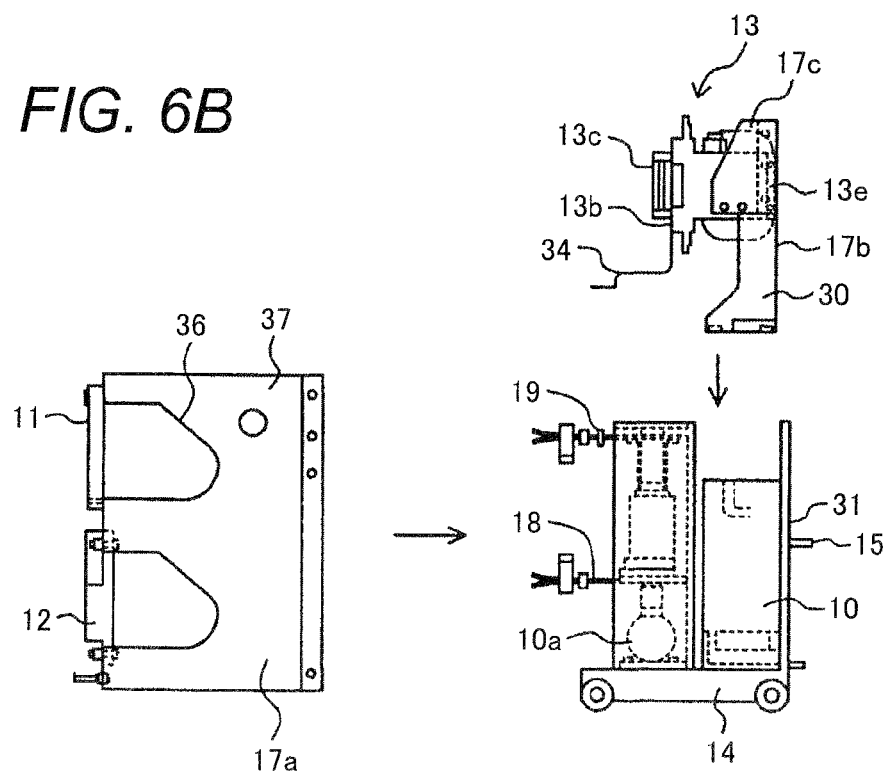

Elements, in FIGS. 4 to 6, that are denoted by the same reference numerals as in FIGS. 1 to 3 are identical to the corresponding elements in FIGS. 1 to 3. The vacuum circuit breaker 9 in the switching unit 8 is mounted on the cart 14, which has four wheels. The vacuum circuit breaker 9 includes the operation unit 10 disposed at the front of the cart 14 and has the shutdown part 10a, disposed behind the operation unit 10, which has three insulated cylinders 30. The front cover 31 is disposed in front of the operation unit 10, on which the rod-shaped drawer handle 15 is disposed substantially at the center in the vertical direction.

The shutdown part 10a of the vacuum circuit breaker 9 has, for example, three movable electrode terminals 19 on the upper side and three fixed electrode terminals 18 on the lower side, these terminals being horizontally disposed.

The frame assembly 17 comprises a side frame sub-assembly 17a to which the zero-phase sequence current transformer 12 and current transformers 11 are attached, a front frame 17b to which the instrument voltage transformer 13 is attached, and two joining plate frames 17c for joining the sides atop the front frame 17b to the tops of the side frames 17a. Although the frame assembly 17 is made of a steel plate, it may be made of, for example, fiber reinforced plastics (FRP) or a metal plate other than a steel plate.

The side frame sub-assembly 17a comprises two substantially rectangular side plates 37, each of which has two vertically aligned semi-elliptic notches 36. The two side plates 37 are disposed facing each other with a spacing substantially equal to the width of the cart 14. The upper corners of each side plate 37 are joined to a current transformer attaching member 35, and the lower corners are joined to another current transformer attaching member 35. A total of four notches 36 in the side frame sub-assembly 17a are formed to prevent a drop in insulation performance that would otherwise be caused when the frame assembly 17 is disposed around the outer circumference of the vacuum circuit breaker 9. The current transformers 11, which enclose two of the three movable electrode terminals 19, are secured to the upper current transformer attaching member 35 with bolts. The zero-phase sequence current transformer 12, which has a race track shape and encloses the three fixed electrode terminals 18 with a single iron core, is secured to the lower current transformer attaching member 35 with bolts. A flange 40a is formed at the top near the front of each side plate 37 of the side frame sub-assembly 17a. The flange 40a faces the inside of the switching unit 8 and has attachment holes.

The front frame 17b comprises a front plate 38, which is substantially rectangular and to which the instrument voltage transformer 13 is fixed with bolts, and two support plates 39, which are substantially thin and rectangular when viewed from the side and secured to the top of the operation unit 10 at both sides of the front plate 38. Each support plate 39 has holes through which it is joined to a joining plate frame 17c.

The joining plate frame 17c is a steel plate, which is substantially trapezoidal when viewed from the side and is U-shaped when viewed from above, as shown in FIG. 4. The trapezoidal side plate of the U-shaped plates has a flange 40b at the bottom, on which holes for attaching the side frame sub-assembly 17a are formed. The other side plate (non-trapezoidal side plate) of the U-shaped plates has holes for attaching the front frame 17b.

The instrument voltage transformer 13 has two single-phase voltage transformers 13a placed side by side to form a circuit through a V/V connection with the movable electrode terminals 19. The single-phase voltage transformer 13a, which is formed by resin-molding, has a main circuit terminal (primary terminal) 13b and a primary-side protective fuse 13c at its top (on the left in FIGS. 4 and 6) and a secondary terminal 13d on its side (at the top in FIGS. 4 and 6). The single-phase voltage transformer 13a is fixed to the front frame 17b through a seat 13e. The main circuit terminal 13b is connected to the terminal 19 through a connection wire 34 at the top of the shutdown part 10a of the vacuum circuit breaker 9, as shown in FIG. 4.

Next, how the switching unit 8 in the solid insulated bus switchgear in the first embodiment of the present invention is assembled will be described with reference to FIGS. 6A and 6B. The upper drawing in FIG. 6A shows a state in which the instrument voltage transformer 13, the connection wire 34, the front frame 17b, and the joining plate frame 17c are disassembled. The lower left drawing in FIG. 6A shows a state in which the current transformer 11, the zero-phase sequence current transformer 12, and the side frame sub-assembly 17a are disassembled. The lower right drawing in FIG. 6A shows a state in which the vacuum circuit breaker 9 is assembled with the operation unit 10 and the shutdown part 10a which are mounted on the cart 14. The switching unit 8 can be broadly divided into three constituent elements in this way, so the entire switching unit 8 can be formed by assembling these constituent elements and then joining them.

In the upper drawing in FIG. 6B, the instrument voltage transformer 13 is bolted to the front frame 17b through the seat 13e. The front frame 17b is joined to the joining plate frame 17c by aligning the attachment holes formed in the support plate 39 of the front frame 17b to the installation holes formed in the non-trapezoidal side plate of the joining plate frame 17c, inserting bolts through these holes, and tightening the bolts.

The front frame 17b is then fixed to the operation unit 10 by bolting the bottoms of the two support plates 39 of the front frame 17b to the top of the operation unit 10. The main circuit terminal 13b of the instrument voltage transformer 13 is connected through the connection wire 34 to the terminal 19 disposed in the upper part of the shutdown part 10a of the vacuum circuit breaker 9.

The side frame sub-assembly 17a is then attached. Specifically, the side frame sub-assembly 17a is fitted to the cart 14 so that the current transformers 11 and the zero-phase sequence current transformer 12 cover the pertinent electrode terminals, and then the lower parts of the two side plates 37 of the side frame sub-assembly 17a are fixed to the cart 14 with bolts. The side frame sub-assembly 17a is joined to the two joining plate frames 17c by aligning the attachment holes formed in the two flanges 40a of the side frame sub-assembly 17a to the attachment holes formed in the two flanges 40b of the joining plate frames 17c, inserting attachment bolts into these holes, and tightening the bolts. FIG. 5 is a side view of the switching unit 8 assembled as described above.

According to the solid insulated bus switchgear in the first embodiment of the present invention, the vacuum circuit breaker 9 and instrument voltage transformer 13 are placed in the single switching unit 8, so a parallel circuit for the vacuum circuit breaker 9 and instrument voltage transformer 13 can be configured as a single stage. By comparison, this type of parallel circuit requires two stages in the stacking structure of a conventional switchgear for electric power reception and distribution.

Furthermore, the main buses 20, communication bus 21, and two leader buses 22 and 23, which are all solid-insulated, are disposed in the bus room 5 behind the unit rooms 4 to shorten the insulation distances among buses, making the storage spaces compact and thereby downsizing the entire switchgear. Accordingly, in a side-by-side configuration, the number of cabinets can be greatly reduced, and thereby the area necessary for switchgears for electric power reception and distribution can be greatly reduced when they are installed side by side.

After the current transformers 11, zero-phase sequence current transformer 12, and instrument voltage transformer 13 have been attached to the frame assembly 17, the frame assembly 17 is attached to the outer circumferences of the vacuum circuit breaker 9 and operation unit 10 mounted on the cart 14. Therefore, when the vacuum circuit breaker 9 needs to be replaced due to, for example, an accident, it suffices to pull out the frame assembly 17 from the cabinet 1, remove the frame assembly 17, replacing the vacuum circuit breaker 9 with a new one, and attaching the frame assembly 17 to the new vacuum circuit breaker 9. The job for recovering from an accident is simplified in this way, and the time to replace the vacuum circuit breaker 9 can be shortened.

Each of the two sides of the frame assembly 17 has two semi-elliptic notches 36 at places corresponding to the current transformers 11 and zero-phase sequence current transformer 12 to ensure the insulation performance of the switching unit 8. Since the instrument voltage transformer 13 is fixed to the frame assembly 17 of this type, the vacuum circuit breaker 9 and instrument voltage transformer 13 can be mounted as a single unit.

Furthermore, since the zero-phase sequence current transformer 12 is disposed at the power supply side of the vacuum circuit breaker 9, the entire load-side including the vacuum circuit breaker 9 can be protected from an earth fault. As a result, the range of protection can be expanded.

Although, in this embodiment of the present invention, the zero-phase sequence current transformer 12 is disposed around the power supply-side terminals of the vacuum circuit breaker 9 and the current transformers 11 are disposed around the load-side terminals, this is not a limitation; the zero-phase sequence current transformer 12 may be disposed around the load-side terminals, and the current transformers 11 may be disposed around the power supply-side terminals.

Figure 7:
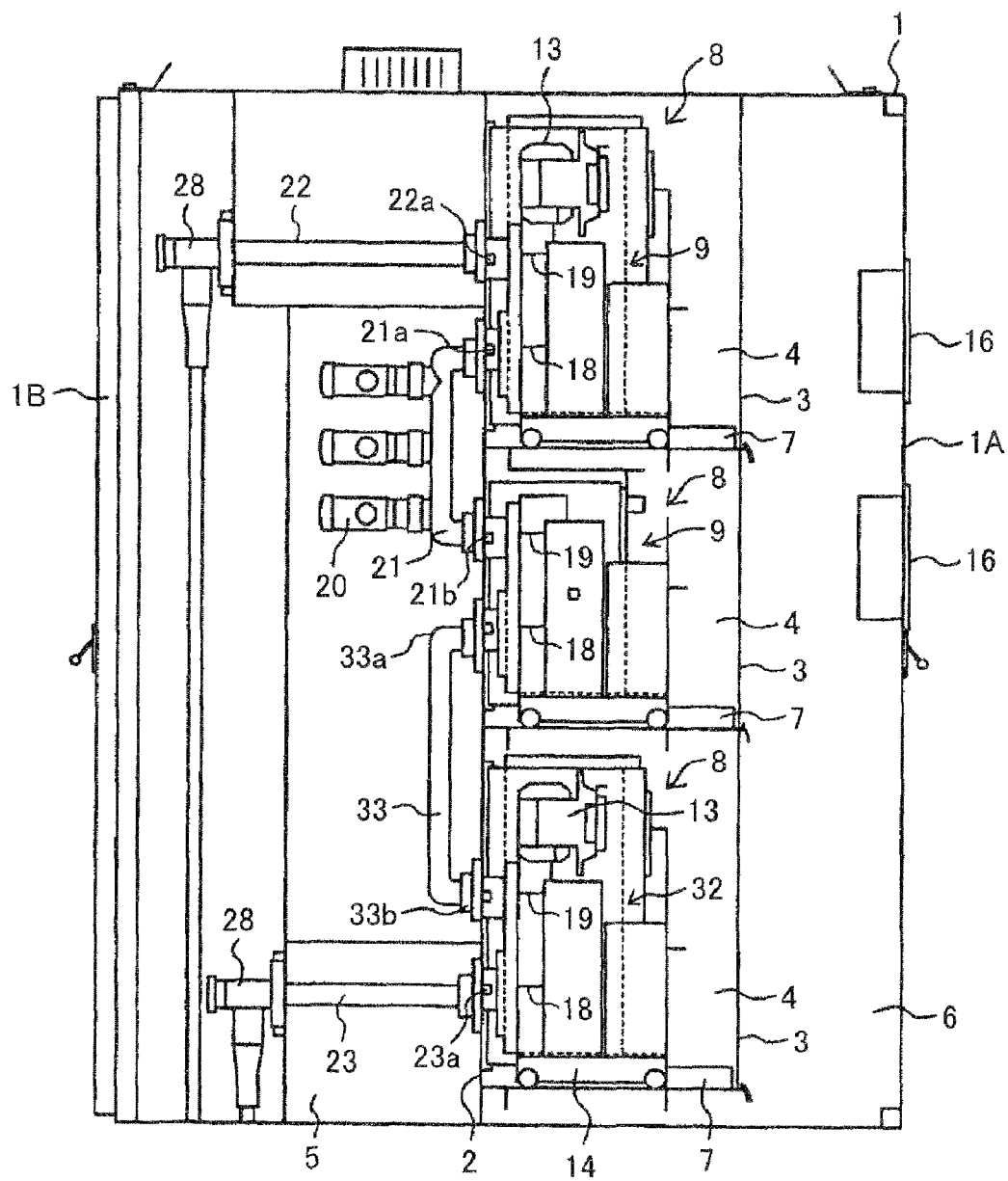
FIG. 7 is a vertical cross sectional view of a solid insulated bus switchgear in a second embodiment of the present invention.
Figure 8:
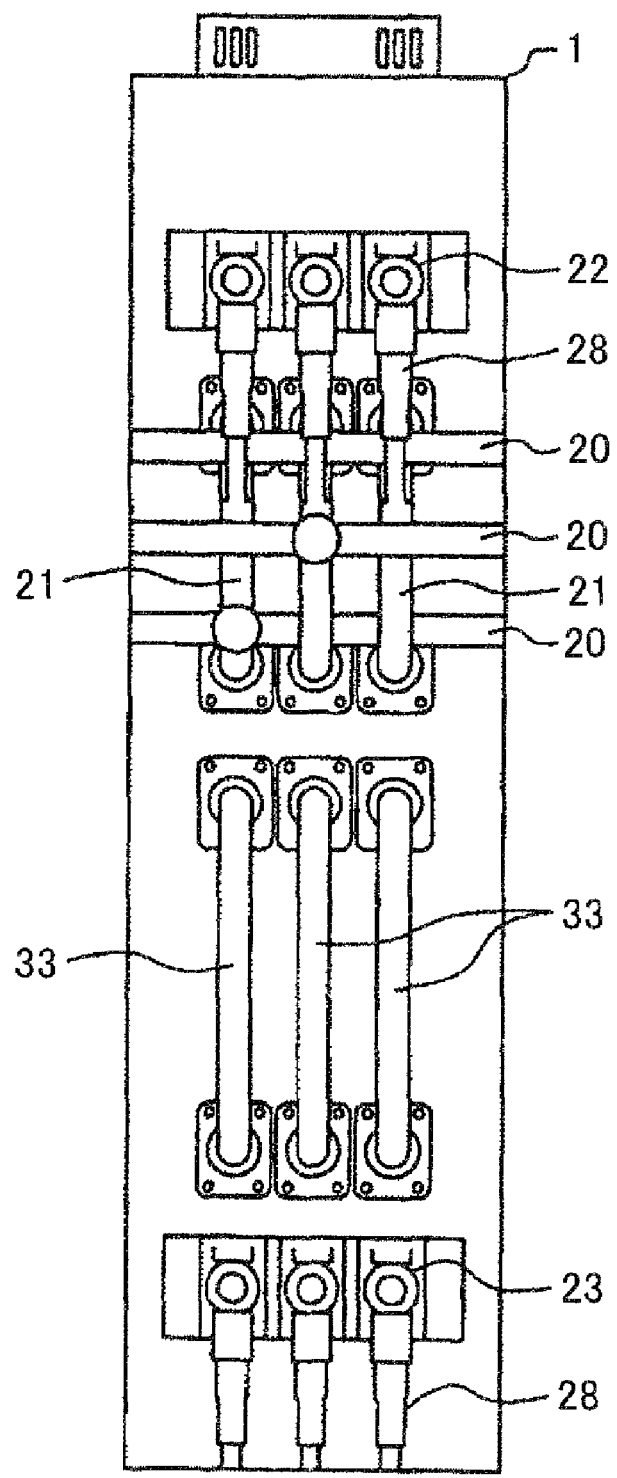
FIG. 8 shows a partial cross section of the back of the solid insulated bus switchgear in the second embodiment of the present invention shown in FIG. 7.
Figure 9:
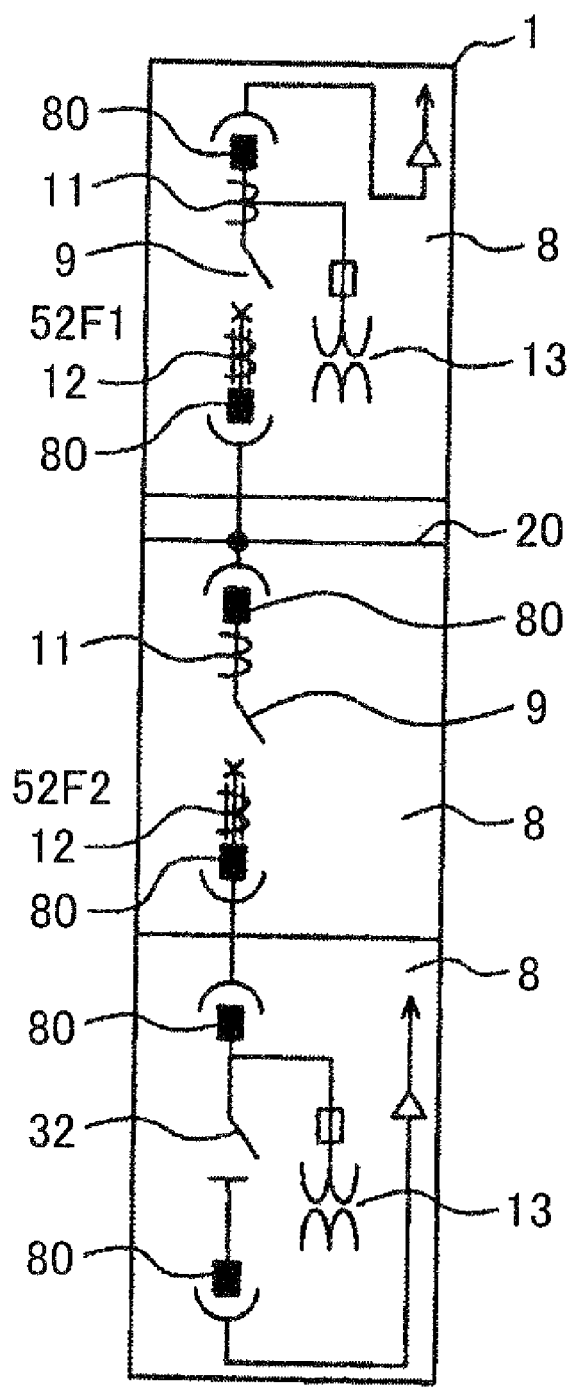
FIG. 9 is a schematic connection diagram of the solid insulated bus switchgear in the second embodiment of the present invention shown in FIG. 7.
Figure 10:
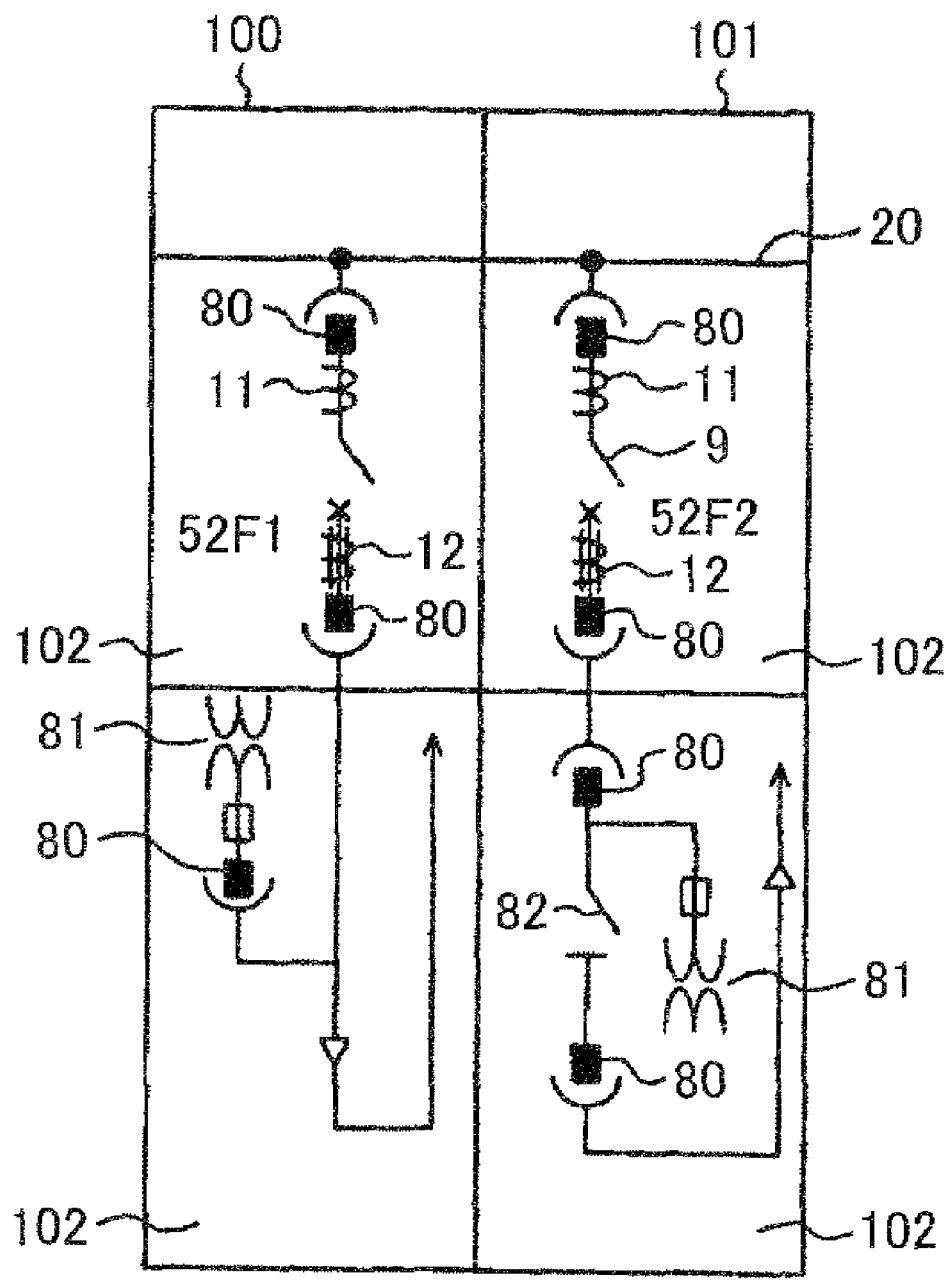
FIG. 10 is a schematic connection diagram of a conventional example of an ordinary electric power reception and distribution switchgear.

Next, a second embodiment of the solid insulated bus switchgear according to the present invention will be described with reference to FIGS. 7 to 10. FIG. 7 is a vertical cross sectional view of the second embodiment of the solid insulated bus switchgear according to the present invention, FIG. 8 shows a partial cross section of the back of the solid insulated bus switchgear in FIG. 7, FIG. 9 is a schematic connection diagram of the solid insulated bus switchgear in FIG. 7, and FIG. 10 is a schematic connection diagram of a conventional example of an ordinary electric power reception and distribution switchgear. In the description that follows, components identical to those in the first embodiment described above will be indicated by the same reference numerals and duplicate descriptions will be omitted.

The ordinary electric power reception and distribution switchgear shown in FIG. 10 comprises two cabinets, denoted by 100 and 101, which are disposed side by side; two units are vertically mounted in each cabinet. One unit 102 is mounted in the upper stage of the cabinet 100, the unit 102 including a vacuum circuit breaker 9, disconnecting parts 80 disposed near the fixed electrode and movable electrode of the vacuum circuit breaker 9, a zero-phase sequence current transformer 12 disposed at the load side of the vacuum circuit breaker 9, and a current transformer 11 disposed at the power supply side of the vacuum circuit breaker 9. Another unit 102 is mounted in the lower stage, the unit 102 including an instrument voltage transformer 81 and another disconnecting part 80. Another unit 102 is mounted in the upper stage of the cabinet 101, the other unit 102 having the same structure as the unit 102 mounted in the upper stage of the cabinet 100. Another unit 102 is also mounted in the lower stage, the other unit 102 including an instrument voltage transformer 81, another disconnecting part 80, and an air disconnecting switch 82. The cabinet 101 is placed on the right of the cabinet 100, side by side. A main bus 20 passes through the two cabinets. The main bus 20 is connected to the two disconnecting parts 80 disposed near the two vacuum circuit breakers 9 so that it can move away from and toward the vacuum circuit breakers 9.

Second Embodiment

A solid insulated bus switchgear in the second embodiment of the present invention is structured with a circuit equivalent to an ordinary electric power reception and distribution switchgear of this type. The solid insulated bus switchgear in this embodiment differs from the solid insulated bus switchgear in the first embodiment in the following points; other points are the same as in the first embodiment.

(1) In the solid insulated bus switchgear in the second embodiment of the present invention, three unit rooms 4 are vertically stacked, each of which is defined by a partitioning plate 2 and a sealing cover 3, as shown in FIG. 7. Accordingly, a total of three switching units 8 are needed, one switching unit in one unit room 4. FIG. 9 shows the structure of the three switching units 8; the switching unit 8 in the upper stage includes a vacuum circuit breaker 9, a disconnecting part 80 disposed near the fixed electrode of the vacuum circuit breaker 9, another disconnecting part 80 disposed near the movable electrode, a current transformer 11 disposed at the load side of the vacuum circuit breaker 9, a zero-phase sequence current transformer 12 disposed at the power supply side of the vacuum circuit breaker 9, and an instrument voltage transformer 13; the switching unit 8 in the intermediate stage includes a vacuum circuit breaker 9, a disconnecting part 80 disposed near the fixed electrode of the vacuum circuit breaker 9, another disconnecting part 80 disposed near the movable electrode, a current transformer 11 disposed at the power supply side of the vacuum circuit breaker 9, and a zero-phase sequence current transformer 12 disposed at the load side of the vacuum circuit breaker 9; the switching unit 8 in the lower stage includes a vacuum circuit breaker 32, a disconnecting part 80 disposed near the fixed electrode of the vacuum circuit breaker 32, another disconnecting part 80 disposed near the movable electrode, and an instrument voltage transformer 13.

(2) In FIG. 7, main buses 20, which are solid-insulated, are provided in the bus room 5 in the width direction of the cabinet 1, behind the unit room 4 in the upper stage and the unit room 4 in the intermediate stage. One edge of a communication bus 21, which is also solid-insulated, is connected to the main buses 20. The other edge of the communication bus 21 is branched; one end of the branch is a connection terminal 21a and the other end is a connection terminal 21b. The connection terminal 21a on the one end is placed in the unit room 4 in the upper stage so that it can move away from and toward the lower terminal 18 in the switching unit 8 in the upper stage. The connection terminal 21b on the other end is placed in the unit room 4 in the intermediate stage so that it can move away from and toward the upper terminal 19 in the switching unit 8 in the intermediate stage. An auxiliary communication bus 33 has connection terminals 33a and 33b; the connection terminal 33a is placed in the unit room 4 in the intermediate stage so that it can move away from and toward the lower terminal 18 in the switching unit 8 in the intermediate stage; the connection terminal 33b is placed in the unit room 4 in the lower stage so that it can move away from and toward the upper terminal 19 in the switching unit 8 in the lower stage. The main buses 20, communication bus 21, leader buses 22 and 23, and auxiliary communication bus 33, which are all solid-insulated, are connected to the backs of the unit rooms 4 as shown in FIG. 8.

According to the second embodiment of the solid insulated bus switchgear described above, the same effect as in the first embodiment can be obtained. In addition, although an ordinary electric power reception and distribution circuit configuration including the instrument voltage transformer 13 has been formed by stacking two electric power reception and distribution switchgears in two cabinets each, this type of circuit configuration can be achieved by stacking three electric power reception and distribution switchgears in a single cabinet. Accordingly, the number of cabinets in a side-by-side configuration can be greatly reduced and thereby the area in which to install electric power reception and distribution switchgears side by side can be greatly reduced.

After the current transformers 11, zero-phase sequence current transformer 12, and instrument voltage transformer 13 have been attached to the frame assembly 17, the frame assembly 17 is attached to the outer circumferences of the vacuum circuit breaker 9 and other components mounted on the cart 14. Therefore, whether to attach the current transformer 11 and other units can be easily determined and installation places can be easily changed. Thus, since common and easy-to-assemble parts are used, production costs can be reduced.

Although, in the embodiments of the present invention described above, the cable 29 extends upward from the cabinet 1, it can also be extended downward.

What is claimed is:

1. A solid insulated bus switchgear, comprising:
a cabinet having unit rooms defined by a ground metal plate on a front side thereof and a bus room defined by a ground metal plate on a rear side thereof;
a first switching unit and a second switching unit, each of which has a circuit breaker, a current transformer, a zero-phase sequence current transformer, and an instrument voltage transformer, the first switching unit and the second switching unit being vertically stacked in the cabinet;
main buses, which are solid-insulated, placed in the bus room in the cabinet in the width direction of the cabinet;
a communication bus, which is solid-insulated, linked to the main buses, and connected to one end of the first switching unit at one end and to one end of the second switching unit at another end; and
a first leader bus and a second leader bus, which are solid-insulated, the first leader bus being connected to another end of the first switching unit, the second leader bus being connected to another end of the second switching unit,
wherein each of the first switching unit and the second switching unit has a movable cart, the circuit breaker mounted on the cart, and a frame assembly, to which the current transformer, the zero-phase sequence current transformer, and the instrument voltage transformer are attached, and standing on the cart to cover the outer circumferences of three planes including front and both sides of the circuit breaker; and two terminals are vertically disposed upside or downside on the back of the circuit breaker, one being connected to a fixed electrode of the circuit breaker and the other being connected to a movable electrode of the circuit breaker, the two terminals being connected to the communication bus and to the first leader bus or second leader bus through air bushings provided on the cabinet so as to move away from and toward the communication bus and the first leader bus or the second leader bus, wherein the circuit breaker is disposed on the cart, wherein the current transformer is fixed to the frame assembly so as to cover two-phase terminals of three-phase terminals of the circuit breaker at a load side, wherein the zero-phase sequence current transformer is fixed to the frame assembly so as to cover three-phase terminals of the circuit breaker at a power supply side; and wherein the instrument voltage transformer is connected through a fuse to the three-phase terminals of the circuit breaker at the load side or at the power supply side.

2. The solid insulated bus switchgear according to claim 1, wherein the circuit breaker is a vacuum circuit breaker.

3. The solid insulated bus switchgear according to claim 1, wherein the surfaces of the main buses, communication bus, the first leader bus, and the second leader bus are each covered with a ground layer.

4. The solid insulated bus switchgear according to claim 1, wherein the switching unit is accommodated in the cabinet so as to be drawn toward the front of the cabinet.

5. A solid insulated bus switchgear, comprising:
a cabinet having unit rooms defined by a ground metal plate on a front side thereof and a bus room defined by a ground metal plate on a rear side thereof;
a first switching unit and a second switching unit, each of which has a circuit breaker, a current transformer, a zero-phase sequence current transformer, and an instrument voltage transformer, the first switching unit and the second switching unit being vertically stacked in the cabinet;
main buses, which are solid-insulated, placed in the bus room in the cabinet in the width direction of the cabinet;
a communication bus, which is solid-insulated, linked to the main buses, and connected to one end of the first switching unit at one end and to one end of the second switching unit at another end; and
a first leader bus and a second leader bus, which are solid-insulated, the first leader bus being connected to another end of the first switching unit, the second leader bus being connected to another end of the second switching unit,
wherein each of the first switching unit and the second switching unit has a movable cart, the circuit breaker mounted on the cart, and a frame assembly, to which the current transformer, the zero-phase sequence current transformer, and the instrument voltage transformer are attached, and standing on the cart to cover the outer circumferences of three planes including front and both sides of the circuit breaker; and
two terminals are vertically disposed upside or downside on the back of the circuit breaker, one being connected to a fixed electrode of the circuit breaker and the other being connected to a movable electrode of the circuit breaker, the two terminals being connected to the communication bus and to the first leader bus or second leader bus through air bushings provided on the cabinet so as to move away from and toward the communication bus and the first leader bus or the second leader bus,
wherein the instrument voltage transformer is formed with two single-phase voltage transformers that are disposed side by side on the inside of the front of the frame assembly.

6. A solid insulated bus switchgear, comprising:
a cabinet having unit rooms defined by a ground metal plate on a front side thereof and a bus room defined by a ground metal plate on a rear side thereof;
a first switching unit and a second switching unit, each of which has a circuit breaker, a current transformer, a zero-phase sequence current transformer, and an instrument voltage transformer, the first switching unit and the second switching unit being vertically stacked in the cabinet;
main buses, which are solid-insulated, placed in the bus room in the cabinet in the width direction of the cabinet;
a communication bus, which is solid-insulated, linked to the main buses, and connected to one end of the first switching unit at one end and to one end of the second switching unit at another end; and
a first leader bus and a second leader bus, which are solid-insulated, the first leader bus being connected to another end of the first switching unit, the second leader bus being connected to another end of the second switching unit,
wherein each of the first switching unit and the second switching unit has a movable cart, the circuit breaker mounted on the cart, and a frame assembly, to which the current transformer, the zero-phase sequence current transformer, and the instrument voltage transformer are attached, and standing on the cart to cover the outer circumferences of three planes including front and both sides of the circuit breaker; and
two terminals are vertically disposed upside or downside on the back of the circuit breaker, one being connected to a fixed electrode of the circuit breaker and the other being connected to a movable electrode of the circuit breaker, the two terminals being connected to the communication bus and to the first leader bus or second leader bus through air bushings provided on the cabinet so as to move away from and toward the communication bus and the first leader bus or the second leader bus,
wherein each of both sides of the frame assembly has semi-elliptic notches at places corresponding to the current transformer and zero-phase sequence current transformer to maintain insulation performance.

7. A solid insulated bus switchgear, comprising:
a cabinet having unit rooms defined by a ground metal plate on a front side thereof and a bus room defined by a ground metal plate on a rear side thereof;
a switching unit disposed in an upper stage of the cabinet, the switching unit having a circuit breaker, current transformers, a zero-phase sequence current transformer, and an instrument voltage transformer;
a switching unit disposed in an intermediate stage of the cabinet, the switching unit having a circuit breaker, current transformers, and a zero-phase sequence current transformer;
a switching unit disposed in a lower stage of the cabinet, the switching unit having a disconnecting switch and an instrument voltage transformer, the switching unit in the upper stage, the switching unit in the intermediate stage, and the switching unit in the lower stage being vertically stacked in the unit rooms of the cabinet;

main buses, which are solid-insulated, placed in the bus room of the cabinet in the width direction of the cabinet;

a communication bus, which is solid-insulated, linked to the main buses, and connected to one end of the switching unit in the upper stage at one end and to one end of the switching unit in the intermediate stage at the other end;

an auxiliary communication bus, which is solid-insulated, for connecting another end of the switching unit in the intermediate stage to one end of the switching unit in the lower stage; and a first leader bus and a second leader bus, which are solid-insulated, the first leader bus being connected to another end of the switching unit in the upper stage, the second leader bus being connected to another end of the switching unit in the lower stage;

wherein each of the switching unit in the upper stage, the switching unit in the intermediate stage, and the switching unit in the lower stage has a movable cart, the circuit breaker or disconnecting switch mounted on the cart, and a frame assembly, to which at least one of the current transformer, the zero-phase sequence current transformer, and the instrument voltage transformer is attached, the frame assembly standing on the cart to cover the outer circumferences of three planes including front and both sides of the circuit breaker or disconnecting switch; and two terminals are vertically disposed upside or downside on the back of the circuit breaker or the disconnecting switch, one being connected to a fixed electrode of the circuit breaker or disconnecting switch and the other being connected to a movable electrode of the circuit breaker or disconnecting switch, wherein the terminals are connected to the communication bus, the auxiliary communication bus, the first leader bus, and the second leader bus through air bushings provided on the cabinet so as to move away from and toward the communication bus, the auxiliary communication bus, the first leader bus, and the second leader bus.

8. The solid insulated bus switchgear according to claim 7, wherein the disconnecting switch in the switching unit in the lower stage is a vacuum disconnecting switch.

* * * * *